(12) United States Patent
Komoda et al.

(10) Patent No.: US 9,239,026 B2
(45) Date of Patent: Jan. 19, 2016

(54) FUEL SUPPLY CONTROL DEVICE AND CONTROL METHOD FOR ENGINE

(75) Inventors: Takao Komoda, Okazaki (JP); Haruki Masuyama, Hekinan (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 260 days.

(21) Appl. No.: 14/114,034

(22) PCT Filed: Apr. 25, 2012

(86) PCT No.: PCT/IB2012/000794
§ 371 (c)(1),
(2), (4) Date: Oct. 25, 2013

(87) PCT Pub. No.: WO2012/146968
PCT Pub. Date: Nov. 1, 2012

(65) Prior Publication Data
US 2014/0048047 A1 Feb. 20, 2014

(30) Foreign Application Priority Data

Apr. 28, 2011 (JP) ................................ 2011-101356

(51) Int. Cl.
| | | |
|---|---|---|
| *B60T 7/12* | (2006.01) | |
| *F02D 41/30* | (2006.01) | |
| *F02D 19/06* | (2006.01) | |
| *F02D 41/00* | (2006.01) | |

(52) U.S. Cl.
CPC ............. *F02D 41/30* (2013.01); *F02D 19/061* (2013.01); *F02D 19/0615* (2013.01); *F02D 19/0642* (2013.01); *F02D 41/0027* (2013.01); *F02D 19/0692* (2013.01); *F02D 41/0025* (2013.01); *F02D 2200/0406* (2013.01); *F02D 2200/0414* (2013.01); *F02D 2200/0606* (2013.01); *Y02T 10/36* (2013.01)

(58) Field of Classification Search
CPC ...... F02D 41/2454; F02D 4/0025; F02B 3/06
USPC .......... 701/104, 114, 115; 123/294, 300, 304, 123/305, 252–529, 27 GE
See application file for complete search history.

(56) References Cited

U.S. PATENT DOCUMENTS

| | | | |
|---|---|---|---|
| 4,169,441 A | 10/1979 | Hirano et al. | |
| 4,917,208 A * | 4/1990 | Komoda | B60T 8/175 123/333 |
| 5,832,905 A | 11/1998 | King et al. | |
| 2002/0026911 A1* | 3/2002 | Green | F01L 1/053 123/68 |
| 2002/0050255 A1* | 5/2002 | Green | F01L 1/053 123/68 |
| 2004/0139944 A1 | 7/2004 | Nakano et al. | |

(Continued)

FOREIGN PATENT DOCUMENTS

| | | |
|---|---|---|
| JP | 7-34915 | 2/1995 |
| JP | 2001-193511 | 7/2001 |

(Continued)

*Primary Examiner* — John Kwon
(74) *Attorney, Agent, or Firm* — Finnegan, Henderson, Farabow, Garrett & Dunner, LLP

(57) ABSTRACT

In an engine that includes a liquid fuel injector and a gaseous fuel injector connected to an intake pipe via a fuel passage and that switches fuel supplied into intake air between liquid fuel and gaseous fuel, an electronic control unit increases fuel in an amount required to fill the fuel passage with gaseous fuel at the time of initial fuel injection from the gaseous fuel injector after switching from liquid fuel to gaseous fuel.

12 Claims, 7 Drawing Sheets

(56) References Cited

U.S. PATENT DOCUMENTS

2010/0251993 A1  10/2010  Sugiyama
2012/0035832 A1* 2/2012  Stucchi ............... F02M 47/027
                                                         701/104

FOREIGN PATENT DOCUMENTS

| JP | 2002-256914 | 9/2002 |
| JP | 2004-211610 | 7/2004 |
| JP | 2010-242559 | 10/2010 |

* cited by examiner

FUEL SUPPLY CONTROL DEVICE AND CONTROL METHOD FOR ENGINE

CROSS-REFERENCE TO RELATED APPLICATIONS

This application is a national phase application of International Application No. PCT/IB2012/000794, filed Apr. 25, 2012, and claims the priority of Japanese Application No. 2011-101356, filed Apr. 28, 2011, the content of both of which is incorporated herein by reference.

BACKGROUND OF THE INVENTION

1. Field of the Invention

The invention relates to a fuel supply control device and control method for an engine of which an injector is connected to an intake pipe via a fuel passage.

2. Description of Related Art

A bifuel (dual-fuel) engine that may be used by switching between gaseous fuel and liquid fuel is practically used as a vehicle-mounted engine. In an engine of this type, it may be difficult to directly install both an injector for liquid fuel injection and an injector for gaseous fuel injection in an intake pipe in terms of installation space. In such a case, for example, as described in Japanese Patent Application Publication No. 2010-242559 (JP 2010-242559 A), there is a configuration that a gaseous fuel injector is installed at a position remote from an intake pipe and gaseous fuel injected from the gaseous fuel injector is introduced into the intake pipe via a fuel passage formed of a pipe, a hose, or the like.

Note that, in the engine of this type, gaseous fuel sometimes remains in the intake pipe immediately after switching from gaseous fuel supply to liquid fuel supply. Then, a fuel supply control device for an engine, described in Japanese Patent Application Publication No. 2001-193511 (JP 2001-193511 A), immediately after switching from gaseous fuel supply to liquid fuel supply, corrects the injection amount of liquid fuel so as to reduce on the basis of the remaining amount of gaseous fuel in the intake pipe.

Incidentally, in the thus configured engine in which the gaseous fuel injector is connected to the intake pipe via the fuel passage, at the time of initial fuel injection after switching from liquid fuel to gaseous fuel, fuel injection is carried out in a state where the fuel passage is not filled with gaseous fuel.

In a state where the fuel passage is filled with fuel, as fuel is injected from the gaseous fuel injector, fuel in the injected amount is pushed out from the fuel passage and is supplied into the intake pipe. Thus, at this time, gaseous fuel in the same amount as the injected amount is supplied into intake air. On the other hand, in a state where the fuel passage is not filled with gaseous fuel, even when fuel is injected from the gaseous fuel injector, gaseous fuel is not supplied into intake air until the fuel passage is filled with gaseous fuel. Therefore, as shown in FIG. 7, if a fuel injection command is issued for initial fuel injection after switching fuel as in the case of the subsequent fuel injection, not all the injected fuel is supplied into intake air, and the amount of supplied fuel does not reach a required amount at the initial injection, so the air-fuel ratio temporarily deviates toward a lean side immediately after switching fuel. Then, as a result, the combustion condition deteriorates to thereby lead to deterioration of drivability and emissions.

Note that such inconvenience can similarly occur even in the case where injected fuel is liquid but in an engine in which an injector is connected to an intake pipe via a fuel passage having a volume larger than a certain extent.

SUMMARY OF THE INVENTION

The invention provides a fuel supply control device and control method for an engine, which is able to supply fuel in an adequate amount into intake air even at the time of initial fuel injection from an injector connected to an intake pipe via a fuel passage.

A first aspect of the invention relates to a fuel supply control device for an engine in which an injector is connected to an intake pipe via a fuel passage. The fuel supply control device includes: fuel amount increase-correcting means for increase-correcting an amount of fuel required to fill the fuel passage with the fuel at the time of initial fuel injection when fuel injection is started by the injector.

In the above aspect, at the time of initial fuel injection when fuel injection from the injector connected to the intake pipe via the fuel passage is started, extra fuel in an amount, with which the fuel passage may be filled, is injected in addition to fuel in an amount required to be supplied into intake air. Therefore, fuel in a required amount is supplied to the engine from initial fuel injection at the time when fuel injection from the injector is started. Thus, with the above configuration, it is possible to supply fuel in an adequate amount into intake air even at the time of initial fuel injection from the injector connected to the intake pipe via the fuel passage.

In the above aspect, the fuel supply control device may further include: fuel injection interruption determining means for determining whether fuel injection by the injector has been interrupted; and fuel correction amount estimating means for, when the fuel injection interruption determining means determines that fuel injection by the injector has been interrupted, estimating a fuel correction amount that is required to fill the fuel passage with the fuel at the time of initial fuel injection when fuel injection is started by the injector after a period during which fuel injection has been interrupted.

In the above aspect, the fuel correction amount estimating means estimates an amount of fuel escaped in the period, during which fuel injection by the injector has been interrupted, as the fuel correction amount.

Note that, as the pressure in the intake pipe increases, the density of fuel filled in the fuel passage increases accordingly. Thus, in the above aspect, the fuel correction amount estimating means may set the fuel correction amount so as to be a larger value as a pressure in the intake pipe increases.

In addition, as the fuel temperature or the intake air temperature in the intake pipe increases, the density of fuel reduces by that much, so the fuel injection amount required to fill the fuel passage with fuel reduces. Thus, in the above aspect, the fuel correction amount estimating means may set the fuel correction amount so as to be a smaller value as at least one of an intake air temperature in the intake pipe and a fuel temperature increases.

Furthermore, normally, the pressure in the intake pipe increases as the engine load increases. Therefore, in the above aspect, the fuel correction amount estimating means may set the fuel correction amount so as to be a larger value as a load of the engine increases.

On the other hand, when fuel has been injected from the injector before, fuel in a certain amount remains in the fuel passage for a certain period after interrupting fuel injection. The remaining amount of fuel reduces as the interruption period extends. Thus, in the above aspect, the fuel correction amount estimating means may set the fuel correction amount so as to be a larger value as the period, during which fuel injection by the injector has been interrupted, extends.

In the above aspect, the fuel injection interruption determining means may determine whether the fuel injection by the injector has been interrupted on the basis of whether the period, during which the fuel injection by the injector has been interrupted, is longer than or equal to a predetermined period of time.

In addition, in a multi-cylinder engine, for reasons of installation, the length, and the like, of the fuel passage connected to each injector may vary and the volume may also vary. In such a case, the fuel injection amount required to fill the fuel passage with fuel varies among the injectors. Thus, in the above aspect, for the engine in which the fuel passages having different volumes are respectively connected to the injectors, the fuel correction amount estimating means may separately calculate the fuel correction amount for each injector.

In the above aspect, the engine may be a multi-cylinder engine in which two types of injectors, that is, a liquid fuel injector that injects liquid fuel and a gaseous fuel injector that injects gaseous fuel, are connected for each cylinder. The fuel correction amount estimating means may estimate the fuel correction amount for each gaseous fuel injector.

In the above aspect, when the period, during which fuel injection by the injector has been interrupted, is a constant period, the amount of fuel supplied by the fuel supply means may be a constant value.

A second aspect of the invention relates to a fuel supply control method for an engine in which an injector is connected to an intake pipe via a fuel passage. The fuel supply control method includes: determining whether fuel injection by the injector has been interrupted; and when it is determined that fuel injection by the injector has been interrupted, estimating a fuel correction amount that is required to fill the fuel passage with the fuel at the time of initial fuel injection when fuel injection is started by the injector after a period during which fuel injection has been interrupted.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, a first embodiment of a fuel supply control device for an engine according to the aspect of the invention will be described in detail with reference to FIG. 1 to FIG. 4. Note that the fuel supply control device according to the present embodiment is applied to a bifuel engine that is able to use gaseous fuel and liquid fuel by switching between gaseous fuel and liquid fuel.

Figure 1:
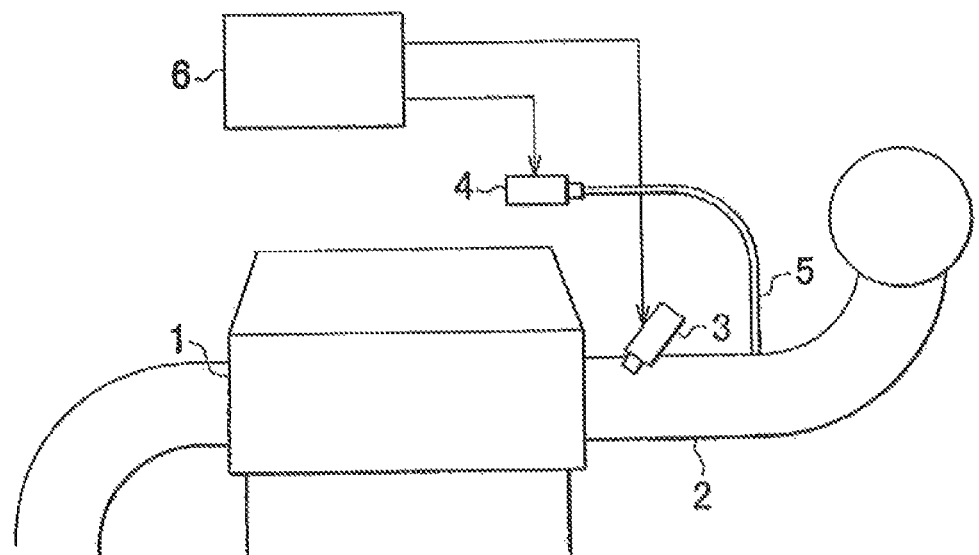
FIG. 1 is a schematic view that schematically shows a mode in which injectors of an engine to which a fuel supply control device according to a first embodiment of the invention is applied are mounted.

First, the configuration of the fuel supply control device for an engine according to the present embodiment will be described with reference to FIG. 1. As shown in the drawing, two injectors, that is, a liquid fuel injector 3 that injects liquid fuel and a gaseous fuel injector 4 that injects gaseous fuel, are connected to an intake pipe (intake manifold) 2 for each cylinder as injectors that inject and supply fuel into intake air flowing inside the intake pipe 2. The intake pipe 2 is connected to the cylinder head 1 of the engine. Each liquid fuel injector 3 is directly connected to the intake pipe 2. In addition, each gaseous fuel injector 4 is connected to the intake pipe 2 via a fuel passage formed of a hose or a pipe.

These two types of injectors are controlled by an electronic control unit 6 that governs engine control. The electronic control unit 6 includes a central processing unit (CPU), a read only memory (ROM) and a random access memory (RAM). The CPU executes various processings associated with engine control. The ROM stores programs and data for engine control. The RAM temporarily stores the processing results of the CPU, the detected results of sensors, and the like. Detected signals of various sensors provided for various portions of the engine, such as an air flow meter, an intake air pressure sensor and a crank angle sensor, are input to the thus configured electronic control unit 6. The air flow meter detects the intake air mass. The intake air pressure sensor detects the pressure in the intake pipe 2 (intake air pressure). The crank angle sensor detects the rotation angle of a crankshaft that is an engine output shaft.

The electronic control unit 6 switches the injectors used for fuel injection on the basis of a driver's operation and the operating condition of the engine to thereby change fuel supplied into intake air. Here, in injecting gaseous fuel, in a state where the fuel passage 5 is filled with gaseous fuel, gaseous fuel in the fuel passage 5 in the amount of gaseous fuel injected from the gaseous fuel injector 4 is pushed out into the intake pipe 2, so gaseous fuel in the same amount as the injected amount is supplied into intake air. On the other hand, in a state where the fuel passage 5 is not filled with gaseous fuel, fuel is not supplied into intake air until the fuel passage 5 is filled with gaseous fuel, so only gaseous fuel in an amount smaller than the injected amount is supplied into intake air. In the above engine, during a period when liquid fuel injection is carried out and gaseous fuel injection has stopped, gaseous fuel in the fuel passage 5 gradually escapes. Therefore, in initial fuel injection after switching from liquid fuel to gaseous fuel, only gaseous fuel in an amount smaller than the injected amount is supplied into intake air.

Then, in the present embodiment, at the time of initial fuel injection after switching from liquid fuel to gaseous fuel, fuel in an amount required to fill the fuel passage 5 with gaseous fuel is corrected to increase to thereby prevent shortage of fuel supply amount to avoid a temporary lean deviation of the air-fuel ratio due to the shortage.

Figure 2:
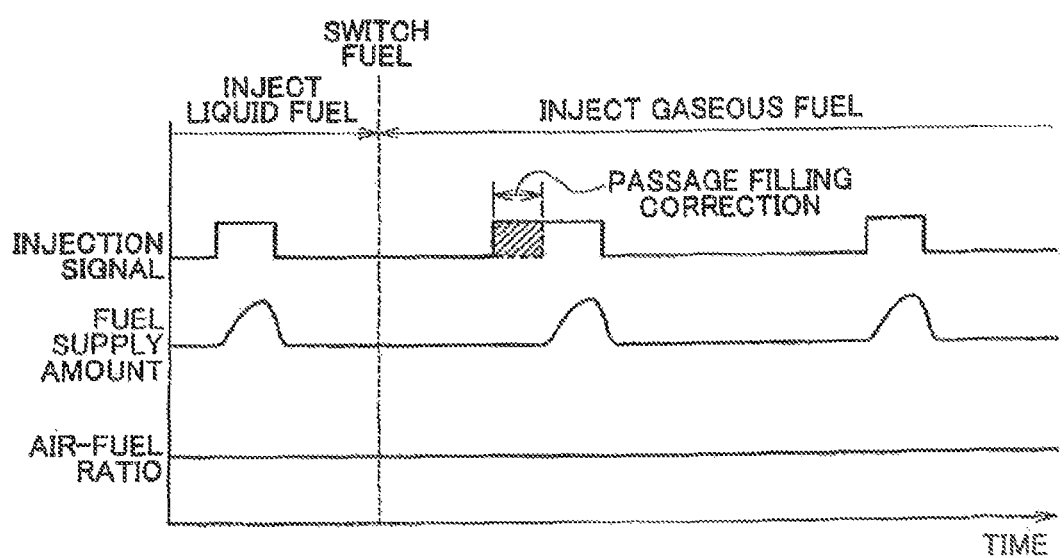
FIG. 2 is a time chart that shows an example of a fuel injection mode before and after the fuel supply control device according to the first embodiment switches fuel.

In the thus configured present embodiment, as shown in FIG. 2, at the time of initial fuel injection from the gaseous fuel injector 4 after switching from liquid fuel to gaseous fuel, an injection signal issued as instructions to each gaseous fuel injector 4 is corrected to increase the fuel injection amount for increasing the amount required to fill the fuel passage 5 with gaseous fuel, that is, the injection signal is subjected to passage filling correction. Therefore, in the present embodiment, even at the time of initial fuel injection from each gaseous fuel injector 4 in a state where the fuel passage 5 is not filled with gaseous fuel, fuel may be supplied without shortage, so a lean deviation of the air-fuel ratio is prevented. Note that, in the case of a multi-cylinder engine, such passage filling correction is carried out for initial fuel injection after switching fuel in the gaseous fuel injector 4 of each cylinder.

Figure 3:
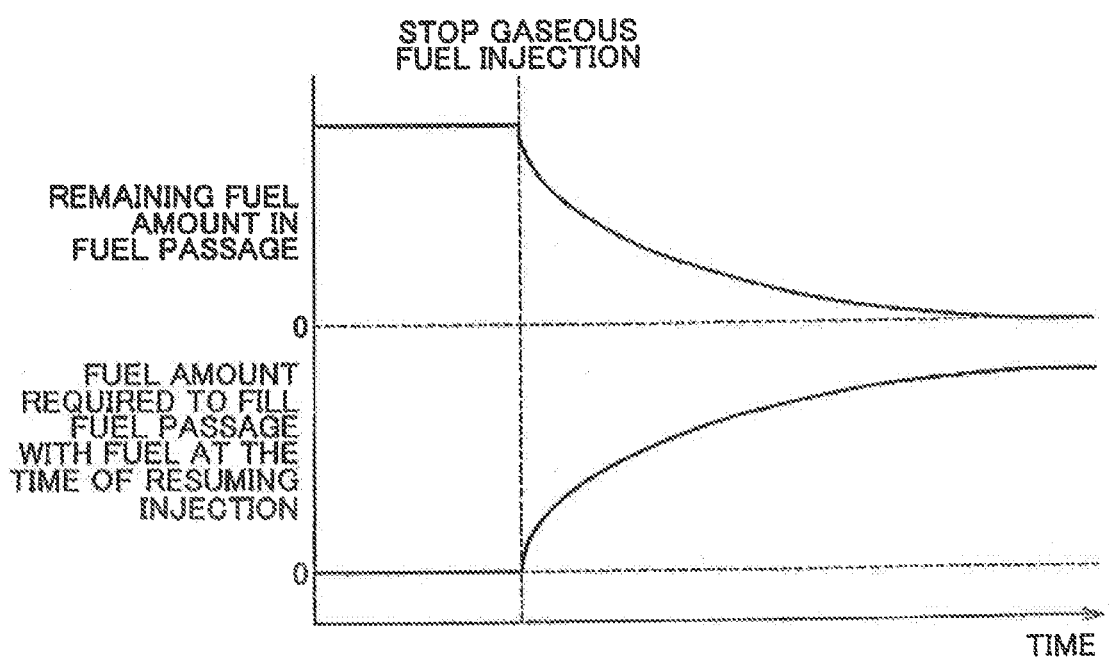
FIG. 3 is a graph that shows changes of the remaining fuel amount in a fuel passage after stopping fuel injection and a fuel amount required to be supplied to the fuel passage at the time of resuming injection.
Figure 4:
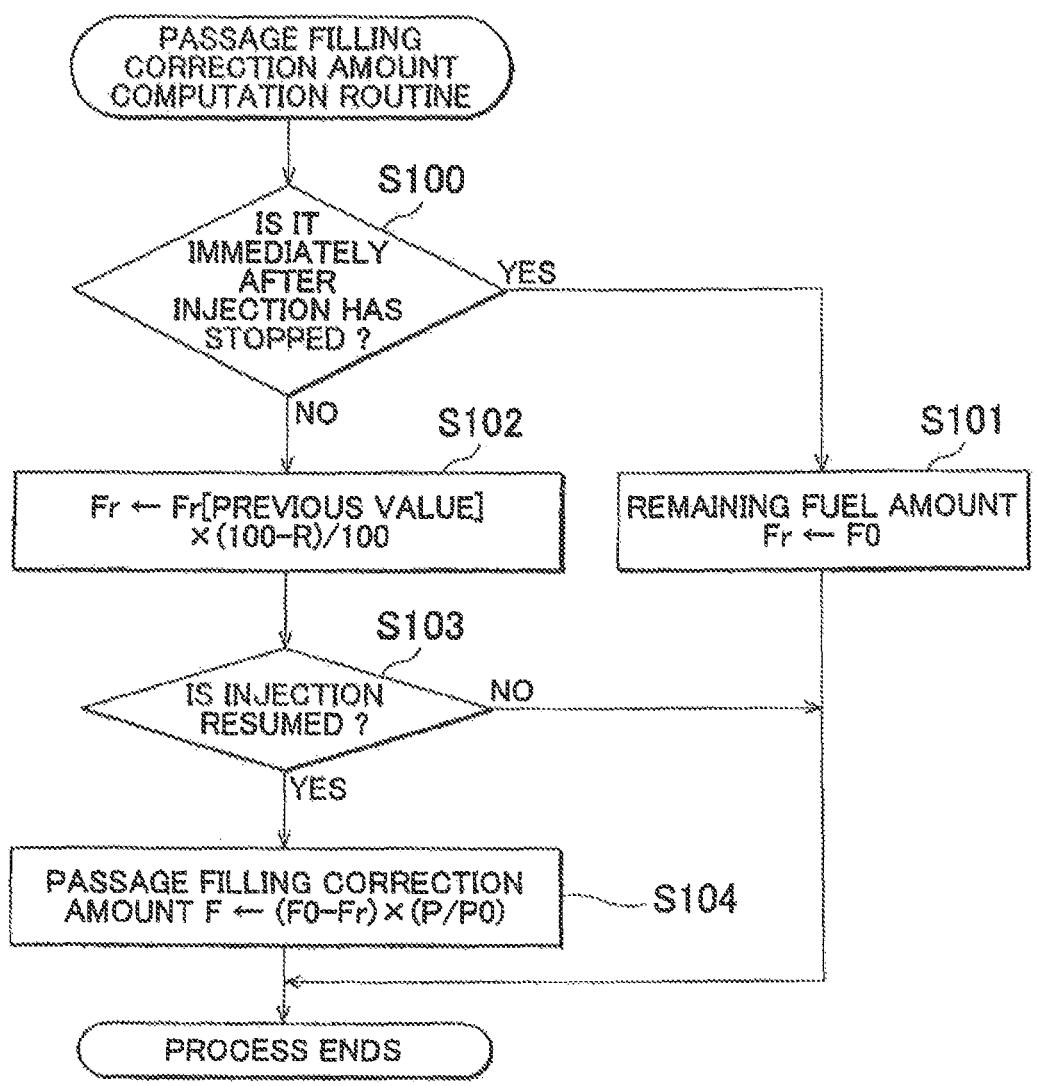
FIG. 4 is a flow chart that shows the procedure of passage filling correction amount computation routine applied to the first embodiment.

On the other hand, the remaining amount of gaseous fuel in the fuel passage 5 varies on the basis of the length of a stop period of gaseous fuel injection. As shown in FIG. 3, the remaining amount of fuel in the fuel passage 5 logarithmically reduces with the stop period extends. Thus, the amount of fuel required to fill the fuel passage 5 with fuel at the time of resuming injection of gaseous fuel, that is, the passage filling correction amount of the gaseous fuel injection amount required at the time of initial gaseous fuel injection after switching fuel, logarithmically increases as shown in the graph.

Next, the computation logic of the passage filling correction amount applied to initial fuel injection from each gaseous fuel injector 4 after switching to gaseous fuel will be described. The passage filling correction amount is computed by passage filling correction amount computation routine shown in FIG. 4. The process of the routine is repeatedly executed by the electronic control unit 6 at prescribed control intervals during a period from when gaseous fuel injection has stopped to when gaseous fuel injection is resumed.

As the process of the routine is started, the electronic control unit 6 initially determines in step S100 whether it is immediately after gaseous fuel injection has stopped. Whether gaseous fuel injection has been stopped is determined on the basis of whether the stop period is longer than or equal to a predetermined period of time. The ECU 6 that makes the above determination may correspond to a fuel injection interruption determining unit according to the aspect of the invention. Here, when it is immediately after gaseous fuel injection has stopped (YES in S100), the electronic control unit 6 sets the remaining fuel amount Fr in the fuel passage 5 at the maximum fuel filling amount F0 in the fuel passage 5 at a prescribed normal intake air pressure P0 (for example, 1 atmospheric pressure) as an initial value in step S101. Then, after that, the electronic control unit 6 ends the current process of the routine.

On the other hand, when it is not immediately after gaseous fuel injection has stopped (NO in S100), the electronic control unit 6 computes the current remaining fuel amount Fr in the fuel passage 5 in step S102. Here, the remaining fuel amount is computed in accordance with the following mathematical expression (1).

$$Fr \leftarrow Fr[\text{previous value}] \times (100-R)/100 \qquad (1)$$

In the mathematical expression (1), "R" denotes a constant that indicates a fuel reduction rate [%] in the fuel passage 5 in a control interval.

As the electronic control unit 6 completes computing the current remaining fuel amount Fr, the electronic control unit 6 determines in the subsequent step S103 whether gaseous fuel injection is resumed. Here, when gaseous fuel injection is not resumed (NO in S103), the electronic control unit 6 directly ends the current process of the routine. On the other hand, when the electronic control unit 6 determines that gaseous fuel injection is resumed, the electronic control unit 6 computes the passage filling correction amount F on the basis of the computed remaining fuel amount Fr and the current intake air pressure P. Here, the passage filling correction amount F is computed in accordance with the following mathematical expression (2).

$$F \leftarrow (F0-Fr) \times (P/P0) \qquad (2)$$

Then, after the electronic control unit 6 computes the passage filling correction amount F, the electronic control unit 6 ends the current process of the routine. The ECU 6 that executes the computation may correspond to a fuel correction amount estimating unit according to the aspect of the invention.

Although not specifically described, the ECU 6 fills fuel into the fuel passage 5 on the basis of the computed passage filling correction amount F. In addition, the ECU 6 that executes the control may correspond to a fuel supply unit according to the aspect of the invention.

Note that, according to the above described mathematical expression (2), as the intake air pressure P increases, the passage filling correction amount F increases. This is because, as the intake air pressure P increases, the density of gaseous fuel in the fuel passage 5 increases, and a larger amount of gaseous fuel is required to fill the fuel passage 5.

With the fuel supply control device for an engine according to the above described first embodiment, the following advantageous effects may be obtained.

(1) In the present embodiment, at the time of initial fuel injection when fuel injection from each gaseous fuel injector 4 connected to the intake pipe 2 via a corresponding one of the fuel passages 5 is started, extra fuel in the amount, with which the corresponding fuel passage 5 may be filled, is injected in addition to the fuel injection amount required to be supplied. Therefore, it is possible to supply fuel in a required amount to the engine from initial fuel injection of each gaseous fuel injector 4. Thus, according to the present embodiment, it is possible to supply fuel in an adequate amount into intake air even at the time of initial fuel injection from each gaseous fuel injector 4 connected to the intake pipe 2 via the corresponding fuel passage 5.

(2) As the intake air pressure P increases, the density of gaseous fuel in each fuel passage 5 increases, and a larger amount of gaseous fuel is required to fill each fuel passage 5. In terms of this point, in the present embodiment, the passage filling correction amount F that is the increasing correction amount applied to initial fuel injection from each gaseous fuel injector 4 is increased as the intake air pressure P increases, so it is possible to supply fuel in an adequate amount at any intake air pressure P.

(3) In the present embodiment, as the interruption period (stop period) of fuel injection from each gaseous fuel injector 4 extends, the passage filling correction amount F is increased. The remaining amount of gaseous fuel in each fuel passage 5 reduces as the stop period of gaseous fuel injection extends, so the passage filling correction amount F is set in such a mode to thereby make it possible to supply fuel in a further adequate amount.

Figure 5:
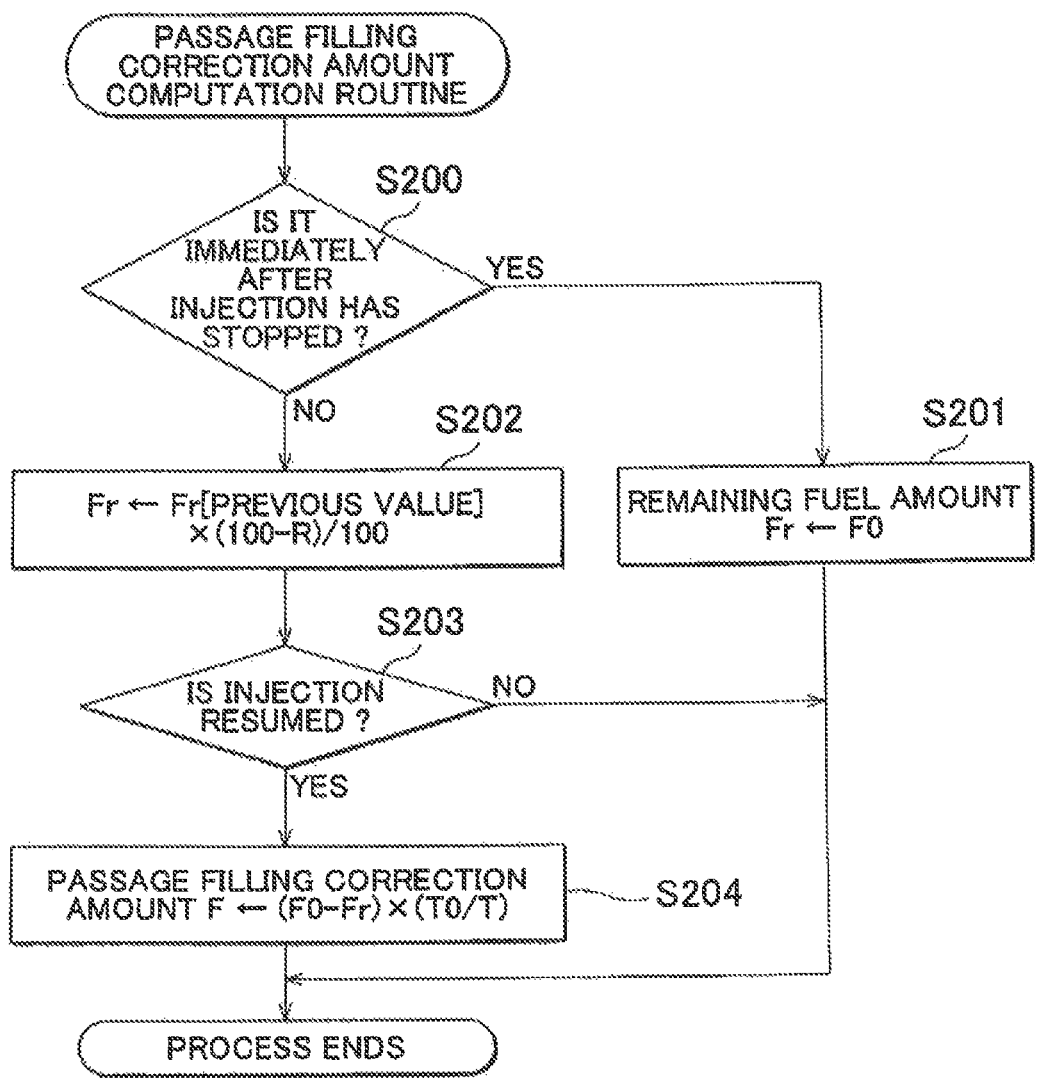
FIG. 5 is a flow chart that shows the procedure of passage filling correction amount computation routine applied to a second embodiment of the invention.

Next, a second embodiment of a fuel supply control device for an engine according to the aspect of the invention will be described in detail additionally with reference to FIG. 5. Note that, in the following embodiments, like reference numerals denote components common to the above described embodiment and the detailed description thereof is omitted.

As described above, in initial fuel injection after switching from liquid fuel to gaseous fuel, extra gaseous fuel in the amount with which each fuel passage 5 is filled needs to be injected in addition to gaseous fuel in the amount required to be supplied into intake air. On the other hand, the density of gaseous fuel injected from each gaseous fuel injector 4 reduces as the temperature of the gaseous fuel increases. Therefore, the mass of gaseous fuel remaining in the corresponding fuel passage 5 reduces as the fuel temperature or the intake air temperature in the intake pipe 2 increases.

Then, in the present embodiment, as the fuel temperature or the intake air temperature in the intake pipe 2 increases, the passage filling correction amount of the gaseous fuel injection amount in initial fuel injection after switching from liquid fuel to gaseous fuel is reduced. The passage filling correction amount is computed by passage filling correction amount computation routine shown in FIG. 5. The process of the routine is repeatedly executed by the electronic control unit 6 at prescribed control intervals during a period from when gaseous fuel injection has stopped to when gaseous fuel injection is resumed.

Then, as the process of the routine is started, the electronic control unit 6 initially determines in step S200 whether it is immediately after gaseous fuel injection has stopped. Whether gaseous fuel injection has been stopped is determined on the basis of whether the stop period is longer than or equal to a predetermined period of time. The ECU 6 that makes the above determination may correspond to the fuel injection interruption determining unit according to the aspect of the invention. Here, when it is immediately after gaseous fuel injection has stopped (YES in S200), the electronic control unit 6 sets the remaining fuel amount Fr in each fuel passage 5 at the maximum fuel filling amount F0 in each fuel passage 5 at a prescribed normal intake air pressure P0 as an initial value in step S201. Then, after that, the electronic control unit 6 ends the current process of the routine.

On the other hand, when it is not immediately after gaseous fuel injection has stopped (NO in S200), the electronic control unit 6 computes the current remaining fuel amount Fr in each fuel passage 5 in step S202. Here, the remaining fuel amount is computed in accordance with the above described mathematical expression (1).

As the electronic control unit 6 completes computing the current remaining fuel amount Fr, the electronic control unit 6 determines in the subsequent step S203 whether gaseous fuel injection is resumed. Here, when gaseous fuel injection is not resumed (NO in S203), the electronic control unit 6 directly ends the current process of the routine. On the other hand, when gaseous fuel injection is resumed, the passage filling correction amount F is computed on the basis of the computed remaining fuel amount Fr and at least one of the current fuel temperature and intake air temperature (T[K]). Here, the passage filling correction amount F is computed in accordance with the following mathematical expression (3). Note that "T0" in the following mathematical expression (3) is a predetermined normal temperature ([K]).

$$F \leftarrow (F0-Fr) \times (T0/T) \quad (3)$$

Then, after the electronic control unit 6 computes the passage filling correction amount F, the electronic control unit 6 ends the current process of the routine. The ECU 6 that executes the computation may correspond to the fuel correction amount estimating unit according to the aspect of the invention.

Although not specifically described, the ECU 6 supplies fuel into the fuel passage 5 on the basis of the computed passage filling correction amount F. In addition, the ECU 6 that executes the control may correspond to the fuel supply unit according to the aspect of the invention.

Note that, according to the above described mathematical expression (3), as the fuel temperature Tf or the intake air temperature Ta increases, the passage filling correction amount F reduces. This is because, as the fuel temperature Tf or the intake air temperature Ta increases, the mass of gaseous fuel remaining in the fuel passage 5 reduces, and the gaseous fuel amount required to fill the fuel passage 5 reduces.

According to the above described second embodiment, in addition to the advantageous effects described in the paragraphs (1) and (3), the following advantageous effects may be further obtained.

(4) As the fuel temperature Tf or the intake air temperature Ta increases, the mass of gaseous fuel remaining in the fuel passage 5 reduces, and a larger amount of gaseous fuel is required to fill the fuel passage 5. In terms of this point, in the present embodiment, the passage filling correction amount F that is the increasing correction amount applied to initial fuel injection from each gaseous fuel injector 4 is decreased as at least one of the fuel temperature and the intake air temperature increases, so it is possible to supply fuel in an adequate amount at any fuel temperature Tf or any intake air temperature Ta.

Next, a third embodiment of a fuel supply control device for an engine according to the aspect of the invention will be described in detail additionally with reference to FIG. 6.

In the first embodiment, the passage filling correction amount F that is the increasing correction amount applied to initial fuel injection from each gaseous fuel injector 4 is corrected on the basis of the intake air pressure P. In addition, in the second embodiment, the passage filling correction amount F is corrected on the basis of at least one of the fuel temperature Tf and the intake air temperature Ta. in contrast to this, in the present embodiment, the passage filling correction amount F is corrected on the basis of both the intake air pressure P and at least one of the fuel temperature and the intake air temperature.

Figure 6:
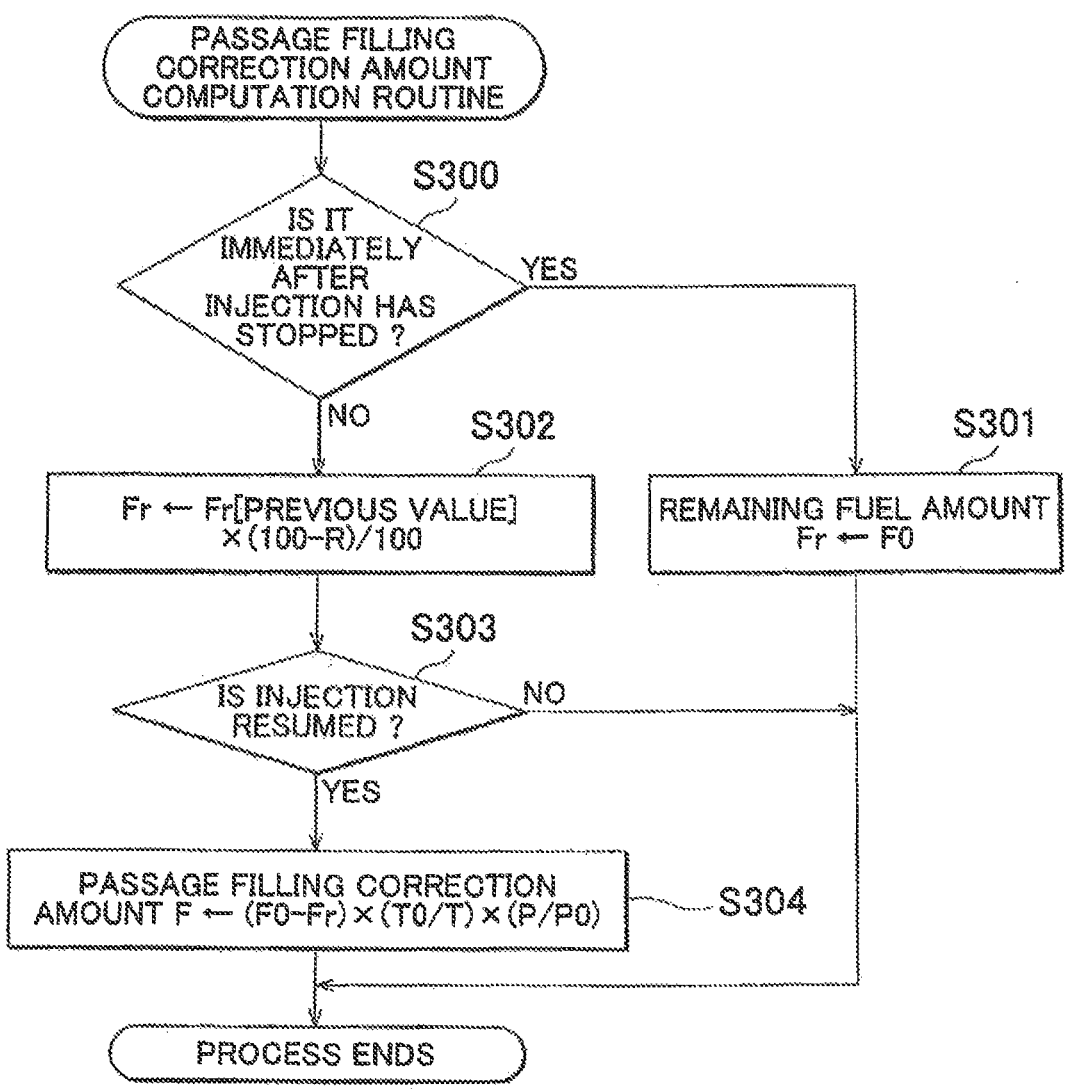
FIG. 6 is a flow chart that shows the procedure of passage filling correction amount computation routine applied to a third embodiment of the invention.
Figure 7:
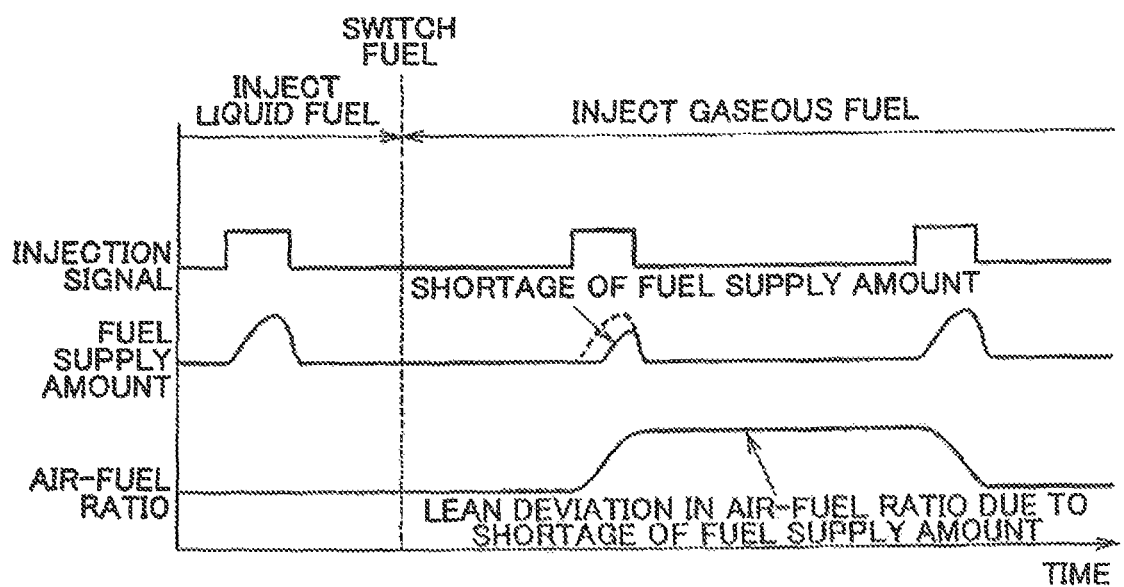
FIG. 7 is a time chart that shows an example of a fuel injection mode before and after a general fuel supply control device switches fuel.

The passage filling correction amount is computed by passage filling correction amount computation routine shown in FIG. 6 in the present embodiment. The process of the routine is repeatedly executed by the electronic control unit 6 at prescribed control intervals during a period from when gaseous fuel injection has stopped to when gaseous fuel injection is resumed.

Then, as the process of the routine is started, the electronic control unit 6 initially determines in step S300 whether it is immediately after gaseous fuel injection has stopped. Whether gaseous fuel injection has been stopped is determined on the basis of whether the stop period is longer than or equal to a predetermined period of time. The ECU 6 that makes the above determination may correspond to the fuel injection interruption determining unit according to the aspect of the invention. Here, when it is immediately after gaseous fuel injection has stopped (YES in S300), the electronic control unit 6 sets the remaining fuel amount Fr in the fuel passage 5 at the maximum fuel filling amount F0 in each fuel passage 5 at a prescribed normal intake air pressure P0 as an initial value in step S301. Then, after that, the electronic control unit 6 ends the current process of the routine.

On the other hand, when it is not immediately after gaseous fuel injection has stopped (NO in S300), the current remaining fuel amount Fr in the fuel passage 5 is computed in step S302. Here, the remaining fuel amount is computed in accordance with the above described mathematical expression (1).

As the electronic control unit 6 completes computing the current remaining fuel amount Fr, the electronic control unit 6 determines in the subsequent step S303 whether gaseous fuel injection is resumed. Here, when gaseous fuel injection is not resumed (NO in S303), the electronic control unit 6 directly ends the current process of the routine. On the other hand, when gaseous fuel injection is resumed, the electronic control unit 6 computes the passage filling correction amount F on the basis of the computed remaining fuel amount Fr and at least one of the current fuel temperature and the intake air temperature (T). Here, the passage filling correction amount F is computed in accordance with the following mathematical expression (4).

$$F \leftarrow (F0-Fr) \times (T0/T) \times (P/P0) \tag{4}$$

Then, after the electronic control unit 6 computes the passage filling correction amount F, the electronic control unit 6 ends the current process of the routine. The ECU 6 that executes the computation may correspond to the fuel correction amount estimating unit according to the aspect of the invention.

Although not specifically described, the ECU 6 supplies fuel into the fuel passage 5 on the basis of the computed passage filling correction amount F. In addition, the ECU 6 that executes the control may correspond to the fuel supply unit according to the aspect of the invention.

In this way, in the present embodiment, the passage filling correction amount F is corrected on the basis of the intake air pressure P and one of or both of the fuel temperature and the intake air temperature.

According to the third embodiment, the advantageous effects described in the paragraphs (1) to (4) may be obtained.

Note that the above described embodiments may be modified into the following alternative embodiments.

In the above described first and third embodiments, as the intake air pressure increases, the passage filling correction amount F is increased. Note that the intake air pressure correlates with an engine load, and, as the engine load increases, the intake air pressure increases. Then, the engine load is used instead of the intake air pressure, and, as the engine load increases, the passage filling correction amount F is increased. By so doing as well, similar fuel supply may be achieved.

In a multi-cylinder engine, the volume of each fuel passage 5 that connects a corresponding one of the gaseous fuel injectors 4 to the intake pipe 2 may vary among the cylinders. In such a case, a required passage filling correction amount F also varies among the cylinders. Thus, in that case, the passage filling correction amount F of each gaseous fuel injector 4 needs to be separately calculated on the basis of the volume of each fuel passage 5 connected to the corresponding gaseous fuel injector 4.

In the above described first embodiment, the remaining fuel amount Fr in the fuel passage 5 is computed in accordance with the above described mathematical expression (1); instead, the mathematical expression for computing the remaining fuel amount Fr may be an appropriate mathematical expression in view of the tendency of changes of the remaining fuel amount in an engine to which the mathematical expression is applied.

In the above described first to third embodiments, the passage filling correction amount F is adjusted on the basis of the stop period of gaseous fuel injection; instead, when the stop period is always longer than or equal to a set period of time and the remaining fuel amount in each fuel passage 5 immediately after switching fuel always becomes approximately "0", adjusting the passage filling correction amount F on the basis of the stop period may be omitted.

In addition, when the stop period of gaseous fuel injection is always constant, the remaining fuel amount in each fuel passage 5 immediately after switching fuel is also constant.

Thus, in such a case as well, adjusting the passage filling correction amount F on the basis of the stop period may be omitted.

In the above described first to third embodiments, at the time of initial fuel injection from each gaseous fuel injector 4, the fuel injection amount is corrected to increase. However, when each liquid fuel injector 3 is connected to the intake pipe 2 via a fuel passage having a volume larger than a certain extent, shortage of the fuel supply amount may similarly occur in each liquid fuel injector 3 at the time of initial fuel injection. Thus, the fuel injection amount for fuel injection from each of the thus configured injectors for liquid fuel injection is also corrected to increase as in the case of the above described embodiments to thereby make it possible to prevent or reduce shortage of the fuel supply amount in initial fuel injection.

In the above described first to third embodiments, the aspect of the invention is applied to a bifuel engine that is able to use gaseous fuel and liquid fuel by switching between gaseous fuel and liquid fuel; instead, the fuel supply control device according to the aspect of the invention may also be applied to an engine that includes only one type injector connected to an intake pipe via a fuel passage.

The invention claimed is:

1. A fuel supply control method for an engine in which an injector is connected to an intake pipe via a fuel passage, comprising:
   determining whether fuel injection by the injector has been interrupted; and
   when it is determined that fuel injection by the injector has been interrupted, estimating a fuel correction amount that is required to fill the fuel passage with the fuel at the time of initial fuel injection when fuel injection is started by the injector after a period during which fuel injection has been interrupted.

2. A fuel supply control device for an engine in which an injector is connected to an intake pipe via a fuel passage, comprising:
   a fuel amount increase-correcting unit configured to increase-correct an amount of fuel required to fill the fuel passage with the fuel at the time of initial fuel injection when fuel injection is started by the injector.

3. The fuel supply control device according to claim 2, further comprising:
   a fuel injection interruption determining unit configured to determine whether fuel injection by the injector has been interrupted; and
   a fuel correction amount estimating unit, when the fuel injection interruption determining unit determines that fuel injection by the injector has been interrupted, configured to estimate a fuel correction amount that is required to fill the fuel passage with the fuel at the time of initial fuel injection when fuel injection is started by the injector after a period during which fuel injection has been interrupted.

4. The fuel supply control device according to claim 3, wherein the fuel correction amount estimating unit is configured to estimate an amount of fuel escaped in the period, during which fuel injection by the injector has been interrupted, as the fuel correction amount.

5. The fuel supply control device according to claim 3, wherein the fuel correction amount estimating unit is configured to set the fuel correction amount so as to be a larger value as a pressure in the intake pipe increases.

6. The fuel supply control device according to claim 3, wherein the fuel correction amount estimating unit is configured to set the fuel correction amount so as to be a smaller value as at least one of an intake air temperature in the intake pipe and a fuel temperature increases.

7. The fuel supply control device according to claim 3, wherein the fuel correction amount estimating unit is configured to set the fuel correction amount so as to be a larger value as a load of the engine increases.

8. The fuel supply control device according to claim 3, wherein the fuel correction amount estimating unit is configured to set the fuel correction amount so as to be a larger value as the period, during which fuel injection by the injector has been interrupted, extends.

9. The fuel supply control device according to claim 3, wherein the fuel injection interruption determining unit is configured to determine whether the fuel injection by the injector has been interrupted on the basis of whether the period, during which the fuel injection by the injector has been interrupted, is longer than or equal to a predetermined period of time.

10. The fuel supply control device according to claim 3, wherein, for the engine in which the fuel passages having different volumes are respectively connected to the injectors, the fuel correction amount estimating unit is configured to separately calculate the fuel correction amount for each injector.

11. The fuel supply control device according to claim 3, wherein:
- the engine is a multi-cylinder engine in which two types of injectors, that is, a liquid fuel injector that injects liquid fuel and a gaseous fuel injector that injects gaseous fuel, are connected for each cylinder; and
- the fuel correction amount estimating unit is configured to estimate the fuel correction amount for each gaseous fuel injector.

12. The fuel supply control device according to claim 2, wherein, when the period, during which fuel injection by the injector has been interrupted, is a constant period, the amount of fuel supplied by the fuel supply device is a constant value.

\* \* \* \* \*